May 19, 1925.　　　　　　　　　　　　　　　　　1,538,107
H. A. GILLER
PISTON RING AND METHOD OF MAKING THE SAME
Filed Dec. 31, 1921　　　3 Sheets-Sheet 2
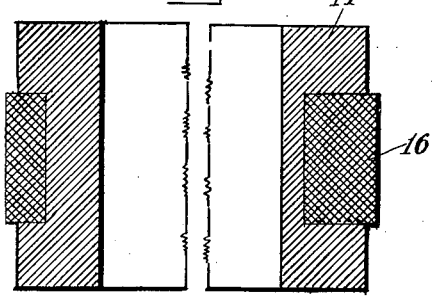
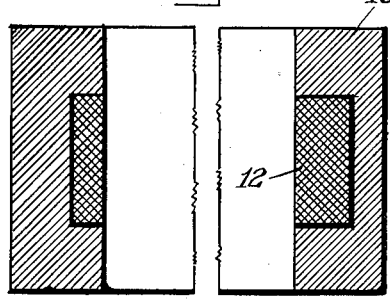
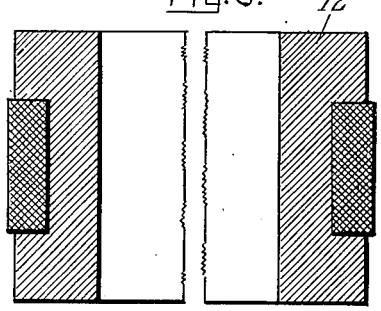
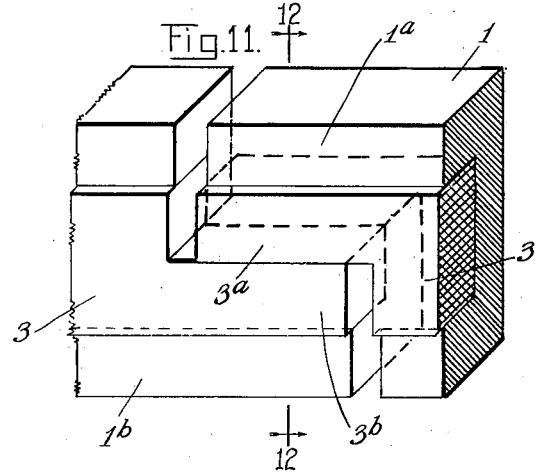
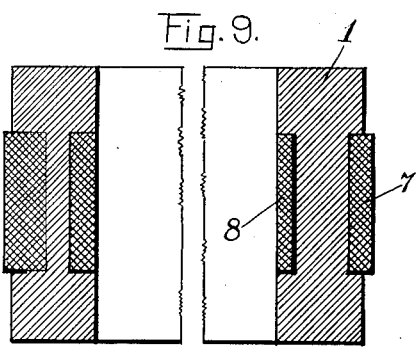
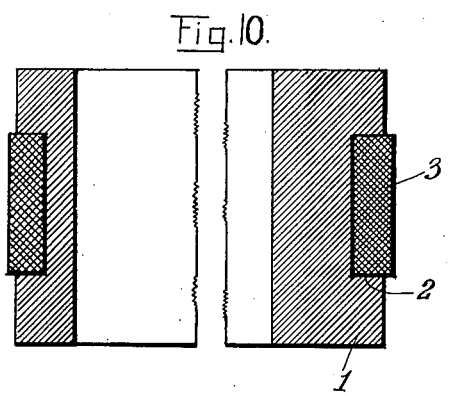
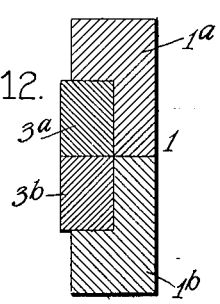
Hugo A. Giller
INVENTOR.
BY
Kenyon & Kenyon
ATTORNEYS May 19, 1925. 1,538,107
H. A. GILLER
PISTON RING AND METHOD OF MAKING THE SAME
Filed Dec. 31, 1921 3 Sheets-Sheet 3
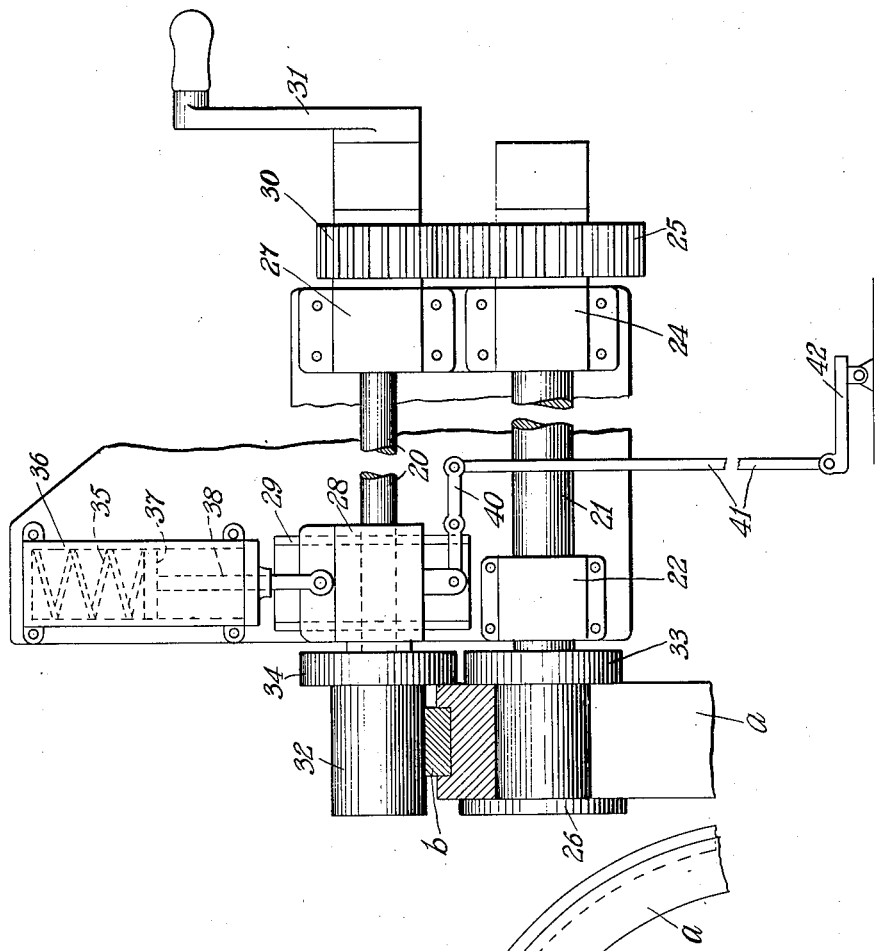
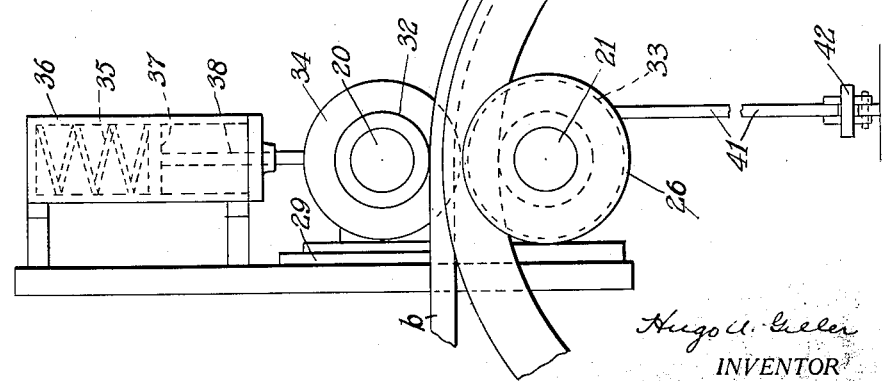
INVENTOR
BY
ATTORNEYS Patented May 19, 1925.

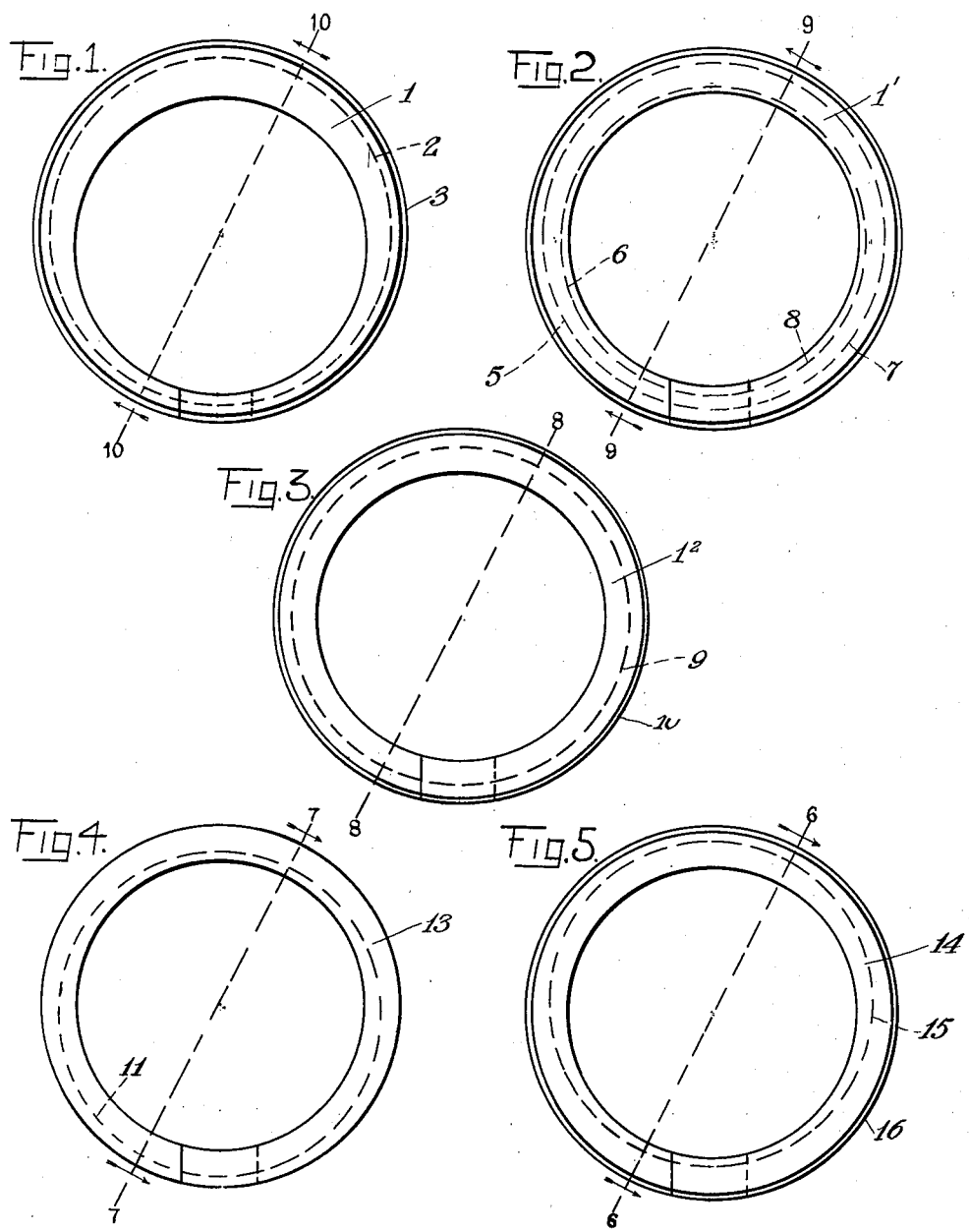

1,538,107

UNITED STATES PATENT OFFICE.

HUGO A. GILLER, OF ELMHURST, NEW YORK.

PISTON RING AND METHOD OF MAKING THE SAME.

Application filed December 31, 1921. Serial No. 526,139.

*To all whom it may concern:*

Be it known that I, HUGO A. GILLER, a citizen of the United States, residing at Elmhurst, in the county of Queens and State of New York, have invented new and useful Improvements in Piston Rings and Methods of Making the Same, of which the following is a specification.

My invention relates to single piece piston rings and a method of making the same, and has for its object the provision of a ring which will form a more effective seal than heretofore attainable. An object of my invention is to provide an expansible piston ring having a body portion provided with a packing band or strip firmly seated in a groove therein, and projecting beyond the body portion of the ring whereby a unitary ring is provided which will quickly conform to cylinder walls to form a perfect seal. A further object being to carry the packing strip or band through the split joint in the ring so as to form in effect a split joint in the packing whereby the packing will be continuous and even though it extends radially behind the body of the ring no open passage from one side of the ring to the other will occur.

Another object of my invention is to provide an expansible piston ring with a central band of softer material which will wear more rapidly than the body portion of the ring so that the top and bottom edges of the ring will not wear in such a manner as to give the outer surface of the ring an axial convex shape.

A further object of my invention is to roll a strip of relatively softer metal into a groove in an expansible piston ring under such pressure that the metal will be worked in the rolling process and a unitary ring will be formed because the strip or band will be fixedly forced into a groove to make a unitary structure. Rolling of the strip extends it laterally to fix it in the groove and extends it longitudinally so that the strip or band is under tension in the groove. The advantage of having the strip so firmly fixed in the groove that a unitary structure is provided is that there is no relative motion between the strip and the body portion of the ring to produce wear on the top and bottom edges of the strip so that there may be a leak from one side of the piston ring to the other behind the strip or a pumping of oil behind it.

Another object of my invention is to provide a method of producing a unitary ring with an iron body portion and a softer central portion in such a manner that the central portion will be firmly seated in a groove and preferably under tension. Another object of my invention is to provide a unitary expansible piston ring having a central soft band of material, the material being carried through the joint in such a manner that the soft material at one side of the joint contacts the soft material at the other side producing an effective seal of the joint. This is particularly advantageous when the soft material projects radially beyond the body of the ring.

This application is a continuation in part of my application Ser. No. 438,058, filed Jan. 17, 1921 and also a continuation in part of my application Ser. No. 444,211, filed Feb. 11, 1921.

In order that the invention may be better understood attention is hereby directed to the accompanying drawings forming a part of this specification and illustrating various constructions of piston ring embodying my invention and apparatus for making such rings. In the drawings, Figs. 1 to 5 inclusive are elevations of various constructions of ring embodying the invention.

Fig. 6 is a section on line 6—6 of Fig. 5.
Fig. 7 is a section on line 7—7 of Fig. 4.
Fig. 8 is a section on line 8—8 of Fig. 3.
Fig. 9 is a section on line 9—9 of Fig. 2.
Fig. 10 is a section on line 10—10 of Fig. 1.

Fig. 11 is an enlarged perspective view illustrating the joint at the cut or division in a piston ring embodying my invention.

Fig. 12 is a cross section on line 12—12 of Fig. 11.

Fig. 13 is an end view of one form of apparatus for making a piston ring embodying my invention; and Fig. 14 is a side view of the apparatus shown in Fig. 12.

Referring to Fig. 1, the piston ring comprises a body ring 1 which has its inner surface eccentric with respect to its outer surface and is divided where it is thinnest peripherally, that is, where the inner and outer surfaces are closest together. By this construction, as understood in the art, the tension of the ring can be made uniform peripherally so that the ring can be made to bear against the cylinder wall with uniform pressure throughout its length. The outer surface of the ring 1 is formed with an annular groove 2 of rectangular cross section in which is fixedly secured a band of packing 3 also of rectangular cross section and preferably of softer metal than the ring 1. The band 3 may, for example, be made of brass, the ring 1 being as usual made of cast iron. The ends of the band 3, as will be more fully explained hereafter, are located at the same position peripherally of the piston ring as the ends of the ring 1 and the band 3 preferably projects slightly beyond the outer surface of the ring 1, the outer surface of the band 3 being cylindrical. A ring constructed in this way has the advantage of uniform tension peripherally and at the same time the relatively soft band 3 adjusts or wears itself quickly to the cylinder wall to form a tight seal therewith. As the band 3 wears more rapidly than the ring 1 the tendency of the piston ring to be worn so as to have a convex outer surface is for all practical purposes overcome; as the inner or central portion of the outer surface of the piston ring wears more rapidly than the outer or edge portions. The ring accordingly remains in contact with the cylinder at different points axially of the ring so that good surface contact is maintained between the piston ring and the cylinder.

In order to effectively form a seal at the division in the piston ring, I form the band 3 so that the latter has in effect a continuous outer surface adapted to bear against the cylinder wall. This is preferably accomplished by providing the ends of the band 3 with overlapping portions $3^a$ and $3^b$ as shown in Fig. 11. With this construction there is no point in the piston ring at which there is an opening for escaping gas to pass from one side of the ring to the other. The ring 1 as shown is also provided with overlapping portions $1^a$ and $1^b$, as shown in Figs. 11 and 12, the band 3 having end portions flush with the corresponding end portions of the ring 1.

Figs. 2 and 9 show a concentric body ring 1', that is, a ring in which the outer and inner surfaces are concentric. To provide for a uniform peripheral tension in the ring I have formed the same with eccentric outer and inner grooves 5 and 6 of rectangular cross section respectively, the two grooves being preferably of different amounts of eccentricity so that the space between the grooves is of varying cross section lengthwise of the groove. Each of these grooves has fixedly secured therein a band of softer metal than the body ring 1'. The outer inserted band 7, as shown, projects slightly beyond the outer surface of the ring 1, the inner inserted band 8 being flush with the inner surface of the ring 1. The inner groove aids in obtaining a uniform pressure throughout the length of the ring and the packing in this groove avoids an opening which might collect carbon and oil and permit the passage of the latter behind the ring into the combustion chamber.

In Figs. 3 and 8 is shown a concentric body ring $1^2$ having a concentric groove 9 rectangular in cross section at the outer surface thereof with a band 10 of softer metal than the body ring $1^2$ fixedly secured therein and projecting slightly beyond the outer wall of the ring $1^2$. In Figs. 4 and 7 I have shown a concentric body ring $1^3$ having an eccentric groove 11 of rectangular cross section at the inner surface thereof, this groove having secured fixedly therein a band 12, the inner surface of which as shown is flush with the inner surface of the body ring $1^3$.

In Figs. 5 and 6 I have shown a concentric body ring $1^4$ having an eccentric groove 15 rectangular in cross section formed in the outer surface thereof, a band 16 being fixedly secured in this groove and projecting slightly beyond the outer surface of the ring $1^4$. It is understood that the band of packing inserted in the groove in all of the constructions shown may be and preferably is made of softer metal than the body ring. All of the rings shown are expansion rings and all of them may be and preferably are provided with overlapping end portions for the body ring and the inserted band substantially as shown.

The inserted band is preferably secured in the body ring sufficiently firmly to produce in effect a unitary ring. For an ordinary piston ring good results are obtainable by pressing the inserted relatively soft packing band into the groove in the body ring under pressure.

In Figs. 13 and 14 is shown suitable apparatus for securing together the body ring and the packing band or strip. In these figures 20 and 21 are parallel shafts, the axes of which are, as shown, in a vertical plane, the shafts being horizontally arranged. The lower shaft 21 is mounted for rotation in fixed bearings 22 and 24 and has a gear 25 adjacent one end and a flanged pressure roll 26 adjacent the other end. The shaft 20 is mounted adjacent its ends in bearings 27 and 28, the former being fixed or stationary and the latter vertically movable, as upon a guide 29, the shaft 20 being sufficiently flexible to permit vertical movement of the bearing 28. A gear 30 is secured to the shaft 20 adjacent the bearing 27 and meshes with the gear 25 so that upon rotation of shaft 20, as by the handle 31, both of the shafts 20 and 21 are rotated. The end of the shaft 20 adjacent the bearing 28 carries a pressure roll 31 coacting with the pressure roll 26. The pressure rolls 26 and 32 are formed respectively with limiting flanges 33 and 34 which are normally in engagement. For pressing the pressure rolls 26 and 32 together with the desired degree of pressure, I provide means, such as the spring 35 interposed between an end wall of the stationary cylinder 36 and the piston 37, the latter being connected by the piston rod 38 to the bearing 28. To permit elevation of the roll 32 against the pressure of the spring 35, and the tension of the shaft 20, I provide suitable means, such as a lever 40 which is connected at one end to the bearing 28 and at the other end to a link 41, the lower end of which is connected to a pedal 42.

In securing together the two parts of the ring, the body ring $a$ is placed upon the roller 26 between the flanges thereof, the roll 32 being previously elevated by depression of the pedal 42. The end of the strip $b$ of metal to be forced into the groove in the ring $a$ is placed in position in the groove with its end located at the division in the ring $a$ whereupon the pressure on the pedal 42 is released, thus permitting the ring 32 to bear on the outer surface of the strip $b$. The crank 31 is now rotated so as to move the ring $a$ and the strip $b$ between the pressure rolls 20 and 21 which by their rolling action force the strip $b$ into the groove in the ring $a$ so as to rigidly secure the said strip and ring together with a strong frictional hold, the metal $b$ yielding or flowing to a certain extent. Inner packing bands are similarly positioned. With my improved ring, no relative movement between the body ring and the inserted band of softer metal is permissible, thus eliminating wear and the resulting looseness of fit between them. Such looseness of fit when present permits a transverse movement of the ring across its groove which produces a pumping of the oil around the inserted ring upon the reciprocation of the piston. The diameters of the limiting flanges 33 and 34 are preferably such that these flanges are out of contact when the strip $b$ has been completely forced home into the groove in the ring $a$, but in contact when the joint is reached or no ring is between the rolls.

While I have specifically described several embodiments of my invention, it is to be understood that I am not limited thereto and that many modifications not herein mentioned may be made without departing from the spirit of my invention.

Having thus described my invention, what I claim as new and desire to secure by Letters Patent, is:

1. A single piece piston ring having a continuous band of relatively soft metal extending around and secured throughout its length to the outer face thereof, said band having side edges spaced inwardly from the side edges of said face, said ring being jointed at one point to permit expansion, the line of severance of said joint running in part circumferentially of said ring intermediate the side edges of said band whereby edges of said band formed by said severance engage at said point and a continuous soft metal surface is presented to a cylinder wall.

2. A unitary piston ring split to permit expansion, comprising a metallic body having an annular groove with a metallic band of softer material than said body seated in said groove and held therein throughout its length by frictional engagement with the walls of the groove, and the said band having a continuous peripheral surface extending radially beyond said body and adapted to bear against the cylinder wall.

3. A unitary piston ring split to permit expansion comprising a metallic body having an annular groove and a metallic band of softer material than said body, the band being rolled into said groove to be fixedly seated therein throughout its length, and the said band having a continuous cylindrical outer surface adapted to bear against the cylinder wall.

4. A unitary piston ring split to permit expansion, having a circumferential groove and a portion of varying cross-section producing a substantially uniform tension circumferentially, and a relatively soft metallic packing fixed in said groove as by rolling or equivalent application of force so that the packing is forced into and retained in said groove throughout its length, the packing presenting a continuous outer cylindrical surface adapted to bear against the cylinder wall.

5. A unitary concentric piston ring split to permit expansion having an eccentric groove in the inner surface thereof, and a relatively soft metallic packing which is forced into said groove in such manner that it is frictionally held therein throughout its length.

6. A unitary concentric expansion piston ring split to permit expansion having eccentric grooves respectively in the inner and outer surfaces thereof, and a packing fixedly held in each of said grooves.

7. A unitary metallic piston ring split to permit expansion, having a circumferential groove and a portion of varying cross-section producing a substantially uniform tension circumferentially, and a packing of softer metal than the body of said ring fitted in said groove and fixedly held therein throughout its length by the tightness of the fit.

8. A unitary concentric expansion piston ring split to permit expansion having eccentric grooves respectively in the inner and outer surfaces thereof.

9. A unitary expansion piston ring split to permit expansion, having eccentric grooves in the inner and outer surfaces thereof, said grooves being of different eccentricities.

10. The method of making piston rings, which comprises rolling a relatively soft strip of metal into a groove in a body ring under a pressure sufficient to work the metal.

11. The method of making expansion piston rings which comprises forcing into a peripheral groove in a metallic body ring a strip of softer metal than said body ring to fixedly secure said strip to said ring with the line of severance of the strip in register with the line of severance forming the expansion joint of the body ring.

12. The method of making expansion piston rings which comprises rolling into a peripheral groove in a metallic body ring a strip of softer metal than said body ring to fixedly secure said strip to said ring.

13. A piston ring having terminals adapted to lap, there being a continuous groove in the outer face of the ring extending from end to end thereof, and a continuous strip of metal softer than the ring seated immovably within the groove and projecting outwardly from the periphery of the ring.

In testimony whereof, I have signed my name to this specification.

HUGO A. GILLER.